Sept. 24, 1963

W. R. AIKEN 3,105,197

SELECTIVE SAMPLING DEVICE UTILIZING COINCIDENT GATING
OF SOURCE PULSES WITH REINFORCED-REFLECTED DELAY
LINE PULSES

Filed Dec. 24, 1958

INVENTOR.
William Ross Aiken

BY *Brown Jackson Boettcher & Dienner*

Attys.

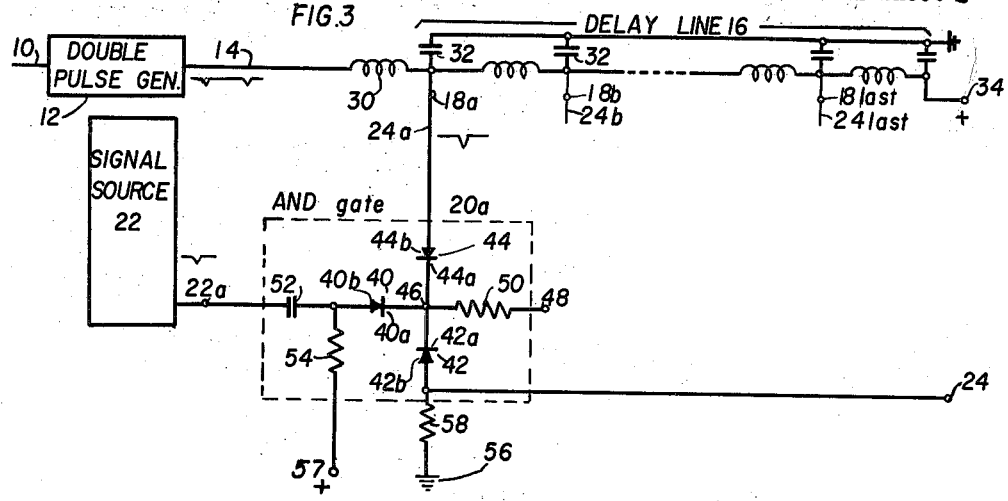
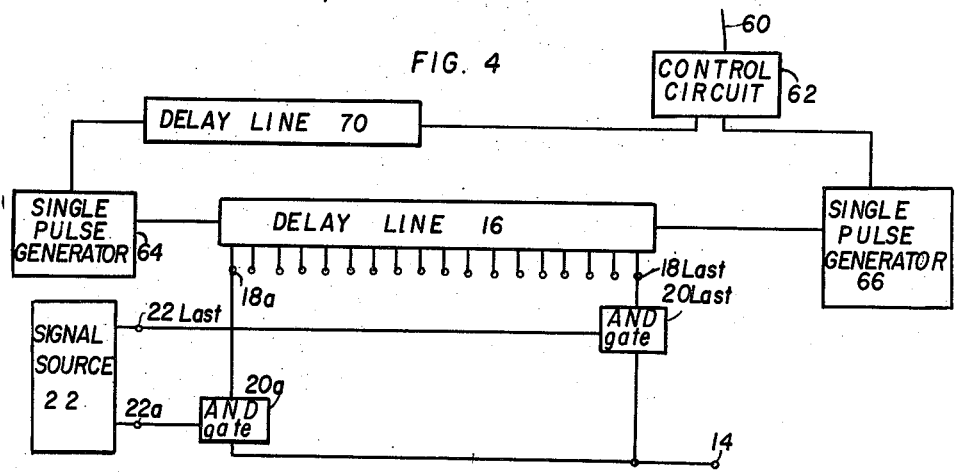
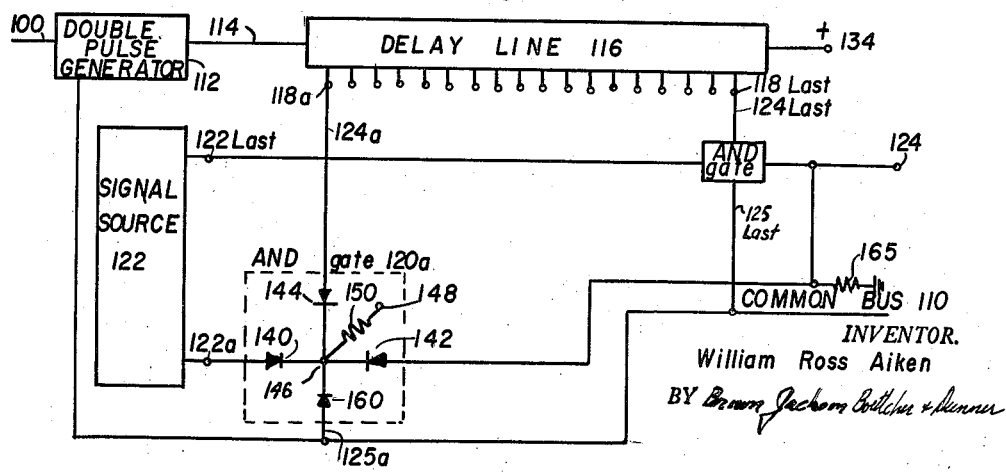

United States Patent Office 3,105,197
Patented Sept. 24, 1963

3,105,197
SELECTIVE SAMPLING DEVICE UTILIZING COINCIDENT GATING OF SOURCE PULSES WITH REINFORCED-REFLECTED DELAY LINE PULSES
William Ross Aiken, Los Altos, Calif., assignor to Kaiser Industries Corporation, Oakland, Calif., a corporation of Nevada
Filed Dec. 24, 1958, Ser. No. 782,776
10 Claims. (Cl. 328—154)

The present invention relates generally to sampling devices, and in particular to electronic means for coupling electrical signals selectively from each of a plurality of different signal sources to an output circuit.

The subject matter of the present invention is considered to be a continuation-in-part of the copending applications having Serial Nos. 528,222, now abandoned, 544,919, now abandoned, 617,878, Patent No. 3,023,316, and 687,486, now Patent No. 2,955,231, filed August 15, 1955, November 4, 1955, March 27, 1956, and October 1, 1957, respectively.

The use of sampling devices to selectively sample each of a plurality of different circuits for the purpose of providing a chain of information bearing pulses or signals has long been known in the military, commercial, and industrial fields. The nature of such devices and their applications are extremely varied, examples of such applications being especially numerous in telemetering, supervisory control systems, data handling systems, and electronic computers.

The known types of sampling devices may be generally cassified as either a sequential sampling device or a selective sampling device. In most applications the provision of a selective sampling device which is operable to effect the sampling of each of a plurality of different circuits in any desired sequence has been found to have many obvious advantages over the so-called sequential type devices which are operative to select each of the circuits in a prearranged, predetermined order. The more obvious advantages include increased flexibility in use, the ability to sample a larger number of circuits, and a more efficient use of associated control equipment.

Sampling devices which are now more commonly used in such applications include the so-called mechanical, mercury-jet and electronic type. The mechanical type sampling device, for example, generally employs a rotating contact which is controlled to engage each of a plurality of stationary contacts in a predetermined sequence. Such type device, by reason of the mechanical nature of its operation is subject to a comparatively high breakdown, short life, and are often too slow to permit the use thereof in electronic control systems. The mercury-jet type sampling devices also employ rotating moving parts, and are subject to the same limitations including narrowly limited operating speeds, relatively short life, and lack of flexibility in operation.

Electronic devices which are operative to provide selective type sampling have been previously developed. However such devices have generally comprised structures which were large, complex, and expensive to operate, and were as a result somewhat limited in application. Further the complexity of the known systems frequently resulted in repeated and expensive maintenance. Other disadvantages of known devices include the high impedance of the component circuits and the problems of crosstalk which are inherent in the switching structures. A further limitation of most known devices is the inability of the units to provide an output signal whose amplitude is dependent upon the amplitude of the sampled input signal. That is, the signal output of most known devices comprises an on-off type signal, which is of only limited value in a control system.

It is a general object of the present invention, therefore, to provide a novel electronic sampling device of the selective and sequential type which provides increased control functions in a more reliable manner, and which is relatively simple, inexpensive and compact in structure.

It is another object of the present invention to provide a selective type electronic sampling device which may be of low impedance to the sampled input signals and which inherently eliminates "crosstalk" in the switching operation.

It is a further object of the present invention to provide a selective electronic sampling device having an output signal which may be dependent upon the amplitude of the sampled input signal. Manifestly, by providing different ones of the input signals with different characteristics (or different values of the same characteristic), selection of the different input signals in different sequences will provide a correspondingly different waveform train.

The novel sampling device of the present invention basically comprises signal generator means which may be controlled to couple control impulses to an associated control device including a delay line which has a plurality of logical circuits connected to the line at spaced increments therealong. In one embodiment the signal generator means transmits a pair of pulses to form a single coincident pulse of increased amplitude at a predetermined point along the delay line, the coincident pulse being of an order to control the energization of the one of the logical circuits which is connected to the delay line at such point. The gate circuit as energized in turn couples a preassigned input signal (which may be individual to the selected logical circuit) to the output terminal of the sampling device.

In one preferred embodiment of the electronic sampling device the delay line includes a plurality of taps which are connected at successive increments along the line, at least one logical circuit being connected to each tap, signal generator means for applying two separate pulses separated by a variable time interval to the delay line, the time interval being subject to control in order to permit selection of the point of coincidence of the two pulses along the delay line, and a set of AND gates, each having at least two input connections and an output connection. In such arrangement, one of the input connections of each AND gate is coupled to the associated one of the taps on the delay line, a second input connection of each AND gate is coupled to an associated set of input terminals for coupling to a signal source, and the output connections of each AND gate are commonly coupled to a single output terminal.

The AND gates are so biased that energization of the gate cannot be provided by a single output pulse of the pulse supply means. Thus a single output pulse may travel down the entire length of the delay line without opening any of the AND gates. However, the coincidence of two such output pulses at a point along the delay line produces a single coincident pulse of a magnitude sufficient to overcome the bias on the gate connected to the delay line at such point to thereby open the AND gate, and to effect coupling of the preassigned signal pulse to the output terminal. Since the point of coincidence of the pulses on the delay line is selectively controllable, any one of the AND gates may be selectively energized by a coincident pulse. The energization of an AND gate permits the signal which is coupled to the input terminal thereof to be coupled to the output terminal in the form of a pulse, the characteristic of which is consistent with the characteristic of the signal applied to the input terminal of the selected AND gate. As noted above, the signals of different input terminals may have different characteristics, or the same characteristics with different values.

In one embodiment of the sampling device of the present invention, the pulse supply means comprises signal generator means for supplying two separate output pulses separated by a variable time interval to a first end of the delay line. The first output pulse travels along the entire length of the delay line, and is reflected back along the line to coincide with the second output pulse. Ostensibly variation of the time interval between transmission of the two pulses will correspondingly vary the point selected. In a second embodiment, the pulse supply means comprises signal generator means for supplying an output pulse at the first end of the delay line, and signal generator means for supplying a second output pulse at the second end of the delay line, each of the signal generator means including means for controlling the time sequence of application of the first and second output pulses to the line to determine the point of coincidence of the pulses on the delay line, and the AND gate to be energized. In a further embodiment the control device includes a delay line and associated set of taps, each of which includes a gate connected thereto. The gates include, in addition to the structure of the above described gates, a control connection which is coupled to a common bus or control circuit, the control connections of each of the different gates being connected to the common bus. In such arrangement the first pulse is applied to the one end of the delay line, and the second pulse is applied to the common bus, and the gate connected between the delay line and the bus at the point of relative coincidence of the pulses is selectively operated thereby. Such arrangement is of advantage in that with the use of time modulation (pulse separation), the gates may be operated at selected rates without being dependent upon the transit time of the pulse along the entire delay line.

The foregoing features, objects and advantages of the invention will become apparent with the consideration of the following description and drawings which disclose various embodiments of the invention, and in which FIGURE 1 is a block schematic diagram of the basic circuit of a first embodiment of the present invention;

FIGURE 3 is a schematic illustration of the delay line and one of the AND gates of the embodiment of FIGURE 1;

FIGURE 4 is a block schematic diagram of a second embodiment of the present invention; and FIGURE 5 is a schematic view of a further embodiment of the novel sampling device.

*Specific Description*

Figure 1:
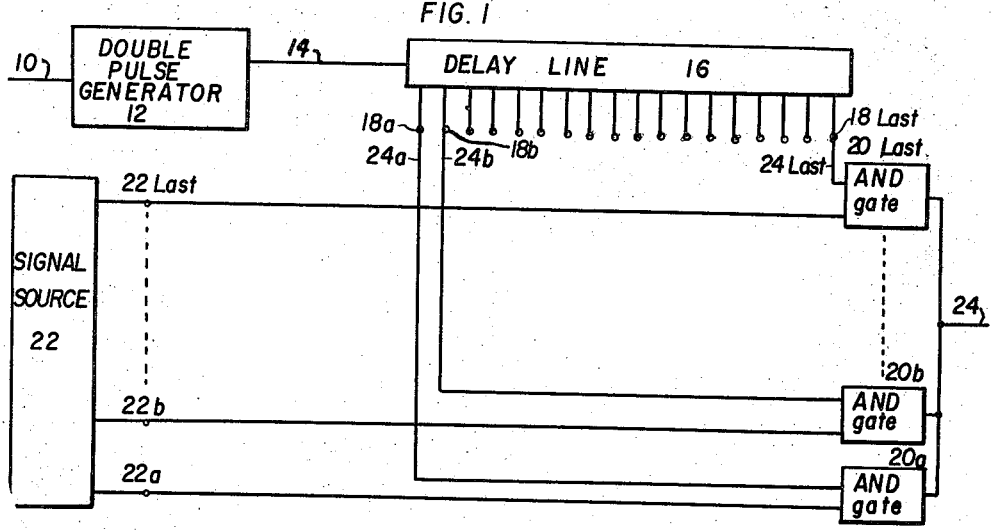

Referring to FIGURE 1, the novel electronic sampling device of a first preferred embodiment basically comprises an input circuit 10 over which control signals are coupled to a double pulse generator unit 12 for the purpose of controlling generation of double sets of pulses having a predetermined time interval therebetween, the value of the time interval being varied in accordance with the nature of the input signal received over control circuit 10.

One form of double pulse generator may comprise that type set forth in copending application, Serial No. 687,486, filed October 1, 1957, modified in accordance with known principles to provide double impulse sets of a negative polarity. The double pulse output impulse sets are coupled over conductor 14 to a delay line 16 which has a plurality of taps, 18a—18 last, coupled at successively spaced increments along the length thereof. Each tap, 18a—18 last, is connected over an associated conductor, 24a—24 last, to an individual one of a plurality of AND gates, 20a—20 last to control the opening and closing thereof. A signal supply source 22 provides control signals over each of a plurality of input terminals, 22a—22 last, each of which is coupled to an associated one of the AND circuits for the purpose of supplying a predetermined signal to its associated AND circuit for gating thereby whenever the associated AND gate is opened by the delay line 16. In the disclosed embodiment, the output signals of the AND gates, 20a—20 last, are coupled to a common output terminal 24.

In the illustrated embodiment, the different output conductors of signal source 22 provide different output signals to the different terminals 22a—22 last. It will be apparent that each conductor of the signal source may be coupled to an individual input terminal, 22a—22 last, as shown, or that one signal conductor may be coupled to several input terminals 22a—22 last. Likewise, the output paths of the AND gates 20a—20 last may be coupled (a) to individual output circuits, (b) to a plurality of output circuits in any desired combination, or (c) as shown, to a common output circuit, such modifications and others clearly being within the scope of the invention.

With the application of a control voltage to input circuit 10, the double pulse generator 12 is operative to generate a pulse train comprising a first and a second output pulse separated by a predetermined time interval. The pulse train so generated is applied over coupling circuit 14 to delay line 16 for transmission along the length thereof. The first output pulse travels along the length of the line to the remote end and is reflected back toward the initial line end, and coincides with the second output pulse at a predetermined point along the line which is determined by the time interval which occurs between the application of the first and second pulses to the delay line. At the point of coincidence of the two output pulses, a coincident pulse of increased amplitude appears on the one of the taps 18a—18 last which is connected to such point on the delay line 16, and is coupled over the input connection of the AND gate 20a—20 last which is coupled thereto.

The AND gates 20a—20 last are each provided with a bias sufficiently large to prohibit energization by any signal on the delay line 16 which is of an amplitude less than the amplitude of a coincident pulse established by the two individual output signals of each set generated by the double pulse generator 12, and of a value to operate in response to the occurrence of a pulse of an amplitude of the coincident pulse value.

As an AND gate, such as gate 20a for example, is selected and operated by delay line 16, the input signal, which is coupled to the input terminal 22a thereof by signal source 22, is coupled by the gate 20a to the common output circuit 24. In that the amplitude of the output signal of an AND gate is equal to the smallest amplitude of its input signals, the amplitude of the single coincident pulse may be made larger than the amplitude of the input signal pulse which is received from the signal source 22, and the output signals coupled to common terminal 24 will be dependent upon the amplitude of the input signal coupled to its associated input terminal 22a—22 last.

The double pulse generator 12 may be connected to cyclically generate pulse trains of two output pulses each, the spacing therebetween being varied by the coupling of different control signals thereto over input circuit 10. In one embodiment the amplitude of the input signal was varied to vary the time interval between the impulses of each train. Since the variable control signal over input circuit 10 can selectively vary the position of the coincidence of the two output pulses along the delay line 16, and thereby the one of the AND gates 20 which is energized, any desired sequence of gate selection may be accomplished, and any desired signal train may be coupled to the output circuit 24 by amplitude modulation of the signal input to the double pulse generator 12.

The double pulse generator 12 may alternatively comprise a free-running multivibrator in certain applications, or a triggered multivibrator in other arrangements; the multivibrator in either embodiment being of the conventional type which may be adapted to provide two pulses over separate output circuits responsive to each flip-flop thereof, and which are adjustable in response to a variable input signal to correspondingly vary the time interval between the two pulses of each train. A typical circuit which is thus operative is illustrated in FIGURE 4 of my above identified copending application having Serial No. 687,486 and reference is made to such disclosure for a detailed description thereof. The specifics of the circuit of the double pulse generator 12, may, of course, be varied with the application of the sampling device to different uses. Thus, although the present embodiment requires the provision of a double pulse generator 12 which is operative to provide impulse sets of a negative polarity, the output of the double pulse generator may be modified in a known manner to provide a signal output of a positive polarity as necessary. In applications in which weight and space requirements are important factors, the pulse generator may be built of transistor and solid state components without departing from the spirit of the invention.

In the embodiment disclosed herein, the double pulse generator 12 is operative to effect the repeated transmission of a series of impulse trains, each train comprising two pulses of a negative polarity, the time interval between the pulses in each train being determined by the amplitude of the signal received over the input circuit for the double pulse generator 12. Variations of the signal over the input circuit 10 change the time interval between the pulses of each train, and thereby change the point of coincidence of the pulses of a set on delay line 16.

The delay line 16 may be of any of a number of lines now available in the art, the general nature of which is shown in Waveforms, Book 19, Radiation Laboratory Series, page 730. The network, as shown in FIGURE 3, basically comprises a plurality of successively connected combinations of inductors 30 and capacitors 32. The rise time, impedance, and length of the line are, of course, determined by the nature of the application. Taps 18a—18 last connected between each combination are coupled to conductors 24a—24 last which are in turn coupled to the input circuits of AND gates 20a—20 last, whereby a pulse traveling along delay line 16 appears at each successive one of the taps 18a—18 last, the time of appearance on successive taps being delayed by successive time periods.

Delay lines now known in the art are extremely compact, certain types utilizing printed circuits and miniature toroidal wound coils with silver mica capacitors, wherein several hundred units are compacted into an extremely small space. The delay line 16 may be of the lumped constant type, as illustrated and described, or of the distributed constant type. In this first preferred embodiment, the delay line 16 is an unmatched line.

The AND gates, 20a—20 last, may be of any of the diode, transistor, or vacuum type circuits which produce an output signal only if signals are applied simultaneously to both input connections. Numerous examples are well known in the art. Specific examples of such type circuits are illustrated in "Pulse and Digital Circuits," Millman and Taub, 1956 edition, pages 398 to 400, and 605. Referring to FIGURE 3, one specific example of such an AND gate circuit is included thereat, and as there shown may comprise a set of three diodes 40, 42, 44, each having a cathode 40a, 42a, 44a, and an anode 40b, 42b, 44b, respectively, the diodes being coupled to provide an output signal from signal source 22 to output terminal 24 only when input terminal 22a and tap 18a are simultaneously energized by an input signal and a coincident pulse respectively.

More specifically, in each AND gate cathodes 40a, 42a, 44a are coupled to a common junction point 46, and the common point 46 is coupled over a resistor 50 to a negative potential source 48. The input terminal 22a is coupled over a capacitor member 52 to the anode 40b of the first diode 40, which is also coupled over a resistor 54 to a fixed reference potential 57. The input terminal 22a may be directly coupled to anode 40b in many embodiments. The output terminal 24 is connected to the anode 42b of the second diode 42, which is also coupled over resistor 58 to the fixed reference potential 56. Resistor 58 is connected common to the diode 42 of each of the gates 20a—20 last. The anode 44b of the third diode 44 is coupled over conductor 24a and its associated tap 18a to the delay line 16. The delay line 16 is biased by a positive potential which is connected thereto over terminal 34.

*Specific Operation*

Figure 2:
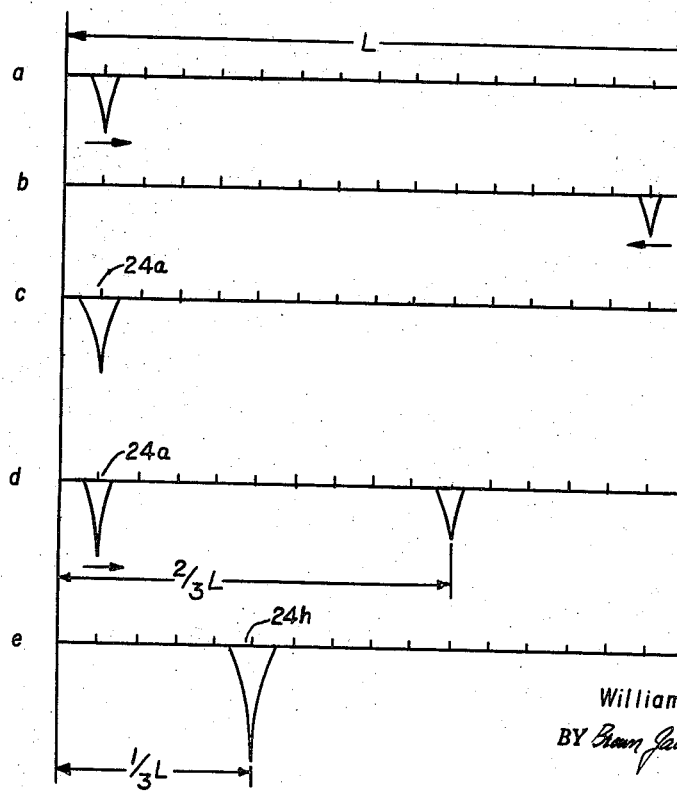
FIGURES 2a–2e illustrate the double impulse sets and the manner in which the impulse sets operate different AND gates of FIGURE 1.

With reference to FIGURES 2a–2c, there is shown in graph form thereat, the manner in which a coincident pulse is achieved to effect selection and energization of a particular one of the AND gates 20, and particularly the manner of travel of the pulses of each pulse train along the delay line 16. With reference first to FIGURE 2a, the vertical axis of the graphic drawing represents the amplitude of the pulses as coupled to delay line 16 by the double pulse generator 12 and the horizontal axis represents the relative length of the delay line 16, the markings on the horizontal axis indicating the different taps 18a—18 last on the delay line 16, and the AND gates, 20a—20 last, connected thereto. The number of taps connected to the line in the drawings, is, of course, considered to be representative, and not limiting.

The pulse in FIGURE 2a represents the first pulse of a train as coupled to the delay line 16. FIGURE 2b shows the first pulse following reflection thereof at the end of the delay line 16, and the reduced amplitude of the pulse as reflected. For purposes of illustration, it is assumed that the double pulse generator 12 is adjusted by the control signal received over the input circuit 10 to effect the application of the second pulse of each train to the line 16 at the time the reflected pulse has returned to the input end of the delay line 16. It will be apparent that the coincident pulse resulting from the meeting of the first pulse, as reflected, and the second pulse will, under such conditions, occur at the tap 18a which is connected to the first AND gate 20a, and as shown in FIGURE 2c, the input signal to AND gate 20a is increased in amplitude by a corresponding value.

The biasing arrangement of the AND gates 20 normally establishes a potential difference of a value sufficient to prohibit energization of the AND gates, 20a—20 last, by the application thereto of the individual output pulses of the double pulse generator 12, but of a value insufficient to prohibit energization of the AND gates, 20a—20 last, with the application of the single coincident pulse thereto. Thus, none of the AND gates 20a—20 last is energized by the first output pulse of the double pulse generator 12 in its travel across the line 16, and in its reflected travel back across the line, until its coincidence with the second output pulse of the train.

Assuming now that sampling of an input signal which is associated with the gate 20h connected to tap 24h located one-third of the distance along the delay line 16 is desired, an input signal which represents such condition is applied to the input circuit 10 for the pulse generator 12 which is operatively responsive thereto to effect a decreased time interval between the successive output pulses of the pulse train.

With reference to FIGURE 2d, it will be apparent that such signal results in the coupling of the second pulse to the delay line 16 at the approximate time that the reflected pulse has returned one-third of the distance along the delay line 16, whereby the coincident pulse will occur at the tap 24h which is located at one-third of the length of the pulse line, and the increased amplitude of the pulse is coupled to the associated AND gate 20h to effect the energization thereof.

A positive bias applied to the AND gates 20a—20 last, not only eliminates the possibility of spurious excitation of the AND gates, 20a—20 last, by the double output pulses of the double pulse generator 12 as the pulses travel along delay line 16, but also insures that only the peak potentials of the single coincident signal are effective to excite the selected AND gates 20a—20 last. Such arrangement takes advantage of the sharpness of the peak of the coincident pulse, and permits the use of pulsing apparatus which provide output pulses having a less sharp rise time.

With reference to FIGURE 3 the manner of operation of a gate, such as AND gate 20a, responsive to the application of a coincident pulse to its associated tap 18a and conductor 24a is now described.

Under normal conditions, that is, when no pulse signal is being received by the AND gate 20a from the delay line 16, the positive potential of source 34 is coupled over delay line 16, tap 18, conductor 24a, to the anode 44b of diode 44, and the negative potential of source 48 is coupled over resistor 50 to the cathode 44a of diode 44 to render the gate diode 44 conductive. The gate diode 44 of the other gates 20b—20 last are also normally conductive in this manner. Diode 44 in its conductive state clamps point 46 to the positive potential of source 34 whereby the cathode 42a of diode 42 is positive relative to the anode 42b, and diode 42 is cut off. Diode 40 may be cut off or may be conducting depending upon the value of the voltage selected for source 57. Whether the gate 40 is conducting or non-conducting the gate 42a will be cut off, and accordingly no signal will be coupled by gate 20a to the output conductor 24.

The double pulse generator 12 used in the illustrated embodiment must be of a type which will produce coincident pulses of a negative polarity. That is, as the coincident negative pulse is generated adjacent the conductor 24a and coupled thereby to the anode 44b of diode 44, the diode 44 is made nonconductive and the pulse must be sufficiently negative to lower anodes 44b of diode 44 below the value of the potential of source 57 so that diode 40 alone clamps the junction point 46 to the voltage of source 57 (minus the IR drop across resistor 54). If a negative signal is coupled by signal source 22 to anode 40b of diode 40 during such period, the voltage of point 46 is correspondingly reduced until point 46 is sufficiently negative to effect the conductivity of diode 42. As diode 42 conducts, the signal which is coupled to the input terminal 22a by signal source 22 is now coupled over the capacitor 52, and diodes 40, 42 to the output terminal 24 for the period during which a coincident pulse is applied to tap 18a.

It is apparent from the foregoing disclosure that the device of the illustrated embodiment is operative to couple an input signal of known characteristics to a given output circuit in response to the application of a coincident pulse to a predetermined tap in a delay line, the provision of different coincident pulses at different points in the line effecting the coupling of correspondingly different output pulses to the output circuit.

As shown schematically in FIGURE 4, the same basic concept of circuit selection may be utilized in a second embodiment of the present invention in which a first pulse is coupled to one end of the line and a second pulse is coupled to the remote end of the delay line in timed relation therewith, the relative time of application determining the point of coincidence of the pulses on the line, and accordingly one of the taps 18a—18 last which is selectively energized thereby.

Briefly, an input circuit 60 is connected to couple input control signals to a control circuit 62, which signals vary in a characteristic, such as voltage, to provide an indication of the different input signals desired sampled. A first single pulse generator 64 is connected to terminate one end of the delay line 16, and a second single pulse generator 66 is connected to terminate the remote end of the delay line 16, each of the generators 64, 66 being operative as energized to couple a single output pulse to the delay line 16 at its associated end. Control circuit 62 is operative to vary the time of application of the pulses at the respective ends of the line 16 to coincide at the particular point on the line 16 to which the tap, 18a—18 last, to be energized is connected. Since the pulses are applied at the respective line ends, there is no need for a reflected pulse, and in the present embodiment, the generators 64 and 66 may be designed to electrically terminate the line 16 at either end. Each of the taps, 18a—18 last, is operative to selectively energize an associated one of the AND gates, 20a—20 last, to couple a preassigned signal from its associated input terminal, 22a—22 last, to output terminal 24 in a manner similar to that described for the first preferred embodiment.

The single pulse generators 64 and 66 may each comprise a vacuum tube amplifier stage having the grid circuits thereof connected to the separate outputs of control circuit 62, and the plate circuits connected to an associated end of the delay line 16.

Control circuit 62, which supplies the energizing signals to the single pulse generators 64, 66, may comprise a modified double pulse generator of the type set forth in FIGURE 4 of the copending application which was filed by W. R. Aiken on October 1, 1957, and received Serial No. 687,486, and which was cited heretofore in the description of the double pulse generator 12. Such a control circuit 62 is capable of providing a first pulse to single pulse generator 64 and a second pulse to single pulse generator 66, the pulses being separated by a controllable, variable time interval.

As shown in FIGURE 4, a delay line is also connected between the control circuit 62 and the single pulse generator 64 to introduce a fixed delay into the signal input thereto which is equal in value to the length of the delay line 16.

With delay line 70 in the system, the pulses applied to generator 64 by the control circuit 62 may be delayed until such time as the pulse applied over generator 66 has traveled the entire length of the delay line 16, and the first coincident pulse is thus caused to occur at the first conductor 18a. As an input signal applied to the control circuit 62 is selectively varied, the pulse applied by generator 66 is applied at a relatively later interval, whereby the pulse applied to the line by generator 64 advances to taps which are connected farther toward the remote end of delay line 16 prior to the coincidence thereof with the pulse output of generator 66. The manner of effecting coincidence of the pulses at different points along the line by adjusting the signal input to circuit 60 is obvious therefrom.

The use of an arrangement in which pulses are applied to the different ends of the line in this manner results in an increased frequency of sampling in that the embodiment permits doubling of the frequency input to the delay line 16, which, in turn, doubles the frequency of energization of the AND gates 20a—20 last. Further, the fact that each pulse is transmitted as generated, results in the provision of a coincident pulse which is of increased amplitude as compared to the coincident pulse of the first embodiment which results from the meeting of a second pulse with a reflected pulse.

It is noted that the illustrated structure for applying separate pulses to the respective ends of the delay line 16 in a relative timed relation has been included for exemplary purposes and is in no way to be considered limiting of the manner in which such concept is practiced. It is apparent, for example, that each generator 64, 66 could have input circuits which are connected to separate control stages in lieu of the common control circuit 62 illustrated herein. It is equally apparent that other known forms of pulse timing arrangements may be readily utilized in lieu of the illustrated control circuit 62 and delay line 70 to effect the relative times of transmission of the two pulses in each operation. These and other modifications within the scope of the invention will be apparent to parties skilled in the art.

A further embodiment of the novel sampling device includes an arrangement wherein a pair of timed pulses are coupled over each of a pair of transmission lines, and in which input terminals on each of the gate devices are connected to the line pair for selective energization by the time pulses thereon.

More specifically, with reference to FIGURE 5, the arrangement basically comprises an input circuit 100 over which control signals are coupled to a double pulse generator 112 for the purpose of controlling generation of sets of double pulses having a predetermined time interval therebetween, the value of the time interval between the pulse of a set being varied in accordance with the nature of the input signal received over control circuit 100. A first pulse of the set is coupled over delay line 116 which has a plurality of taps 118a—118 last coupled thereto at successively spaced increments along the length thereof. Each tap, 118a—118 last, is connected over an associated conductor, 124a—124 last, to an individual one of a plurality of gates, 120a—120 last. The second output signal of each train of impulses provided by the double pulse generator 112 is coupled over the common bus 110 to a second control terminal 125a—125 last on each of the gates 120a—120 last.

A signal supply source 122 provides control signals over each of a plurality of input terminals 122a—122 last, each of which is coupled to an associated one of the gate circuits for the purpose of supplying a predetermined pulse to its associated gate circuit for gating thereby whenever its associated gate is opened by the timed pulses which are coupled to the input conductors 124a—125a of a gate such as 120a. The output circuits of gates 120a—120 last are coupled to a common output terminal 124.

Each of the gates 120a includes four diodes 140, 142, 144 and 160, the cathodes of which are connected to a common control point 146 and over resistor 150 to the negative terminal 148 of the source. The anode of diode 140 is coupled over input terminal 122a to signal source 122; the anode of diode 160 is coupled over conductor 125a to a common bus 110 which is, in turn, coupled to an output terminal of the double pulse generator 112; the anode of diode 144 is coupled over input circuit 124a to tap 118a of the delay line 116; and the anode of diode 142 is coupled to output conductor 124, and also over common resistor 165 to a source of potential of a value which effects biassing of diode 142 to cutoff. In the illustrated arrangement, resistor 165 and conductor 124 are shown connected common to the output circuits of each of the gates 120a—120 last. As will be apparent hereinafter, diode 142 operates in the manner of an isolation device to prevent the signals which are coupled to common conductor 124 from "cross-talking" into the closed gates which are connected thereto.

In the absence of pulse signals on delay line 116 and common bus 110, the positive potential of terminal 134 which is coupled over delay line 116, tap 118a and conductor 124a to the anode of diode 144 is effective with the negative potential of source 148 which is coupled over resistor 150 to the cathode of diode 144, to bias the gate diode 144 to conduct. The gate diode 144 of each of the gates 120a—120 last are biassed to conduct in a similar manner. Common bus 110 is also biassed positive with respect to point 146 to effect conduction of diode 160 in each of the AND gates 120a—120 last.

The conducting condition of diodes 144 and 160 clamps the junction point 146 to the positive potential of source 134 and the common bus 110, and back biasses diode 142. Diode 140 may be conducting or biassed to cutoff as before indicated, the signals which are coupled to the input terminal 122a by signal source 122 being blocked from passage to the output terminal 124 by diode 142.

Double pulse generator 112 is similar to the generator 12 described hereinbefore. The two separate output pulses of each generated train, however, are coupled over two different paths. That is, the first pulse of each train is coupled over conductor 114 and the second pulse is coupled over common bus 110 at a predetermined time thereafter. Ostensibly, the position of the first pulse along the first line 116, as the second pulse is coupled to common bus 110 a predetermined period thereafter, determines the partciular one of the gates 120a—120 last which is energized by the coincident pulses, and accordingly the one of the signal sets which is coupled to the common output circuit. More specifically, as the double pulse generator 112 operates to couple a first negative pulse to delay line 116, the pulse travels along the line adjacent each of the taps 118a, and each of the diodes 144 of each gate 120a—120 last is successively driven to cutoff, and the current path over such diode and its associated resistor 150 is interrupted. However, since the second clamping diode 160 in each of the gates 120 is conductive, none of the gates will open in response to such pulse.

Assuming now that a second pulse is coupled to common bus conductor 110 at a predetermined interval after the pulse is coupled to delay line 116a, and specifically at the time that the pulse is adjacent tap 118a, diode 160 is rendered nonconductive during the same period that the pulse on delay line 116 drives diode 144 nonconductive. With both the diodes 144 and 160 of a gate, such as 120a, baissed to cutoff, the potential of the junction point 146 changes toward the value of the negative signal which is coupled to the anode of diode 140 by source 122a, and as the potential of point 146 becomes more negative than the value of the reference potential on the anode of diode 142, isolation diode 142 conducts, and the signal output of source 122 which appears at terminal 122a is coupled over diodes 140, 142 to the common output circuit 124.

It is apparent that if the pulse generator 112 is modified to couple a plurality of pulses over common bus 110 during the period of travel of the first pulse along delay line 116, a corresponding number of different ones of the gates will be opened, and a number of output signals from source 122 may be selectively coupled to common output conductor 124 during the period of travel of a single signal to delay line 16.

It is also apparent that the double pulse generator 112 may be identical to the generator of FIGURE 1, and that coincident pulses on a delay line may be utilized with a cooperating set of pulses which are coupled to bus 110. Manifestly, each of the arrangements above described may be modified to operate with crystal or other gates as well as with the illustrated diode arrangement.

*Conclusion*

The novel selective electronic sampling device of the present invention provides selective sampling of a plurality of separtae input signals to form a train of output signal pulses, the amplitude of each such output signal pulse being dependent upon the characteristic of the selected one of the input signals. By using the point of coincidence of the single coincident pulse on a delay line to provide selection of a circuit connected to the line at such point, the requirement of complex circuitry, successive flip-flops, and diode matrices or other comparable circuits, is eliminated, to provide a smaller, less complex, and more efficient device of increased reliability. Further, the diode members in the gates block any crosstalk between an operated gate and a nonoperated gate to thereby provide improved switching reliability.

While what is described is regarded to be a preferred embodiment of the invention, it will be apparent that variations, rearrangements, modifications and changes may be made therein without departing from the scope of the present invention as defined by the appended claims.

What is claimed is:

1. In an electronic sampling switch device for selectively controlling the gating of signals from a signal source to an output circuit, a delay line including a set of taps connected to said line at spaced intervals therealong, signal means for coupling at least a first and a second signal to said delay line to coincide at a predetermined one of said intervals to provide a coincident pulse of increased amplitude thereat, and gate means connected to one of said taps responsive only to the occurrence of said coincident pulse of increased amplitude on said line substantially at the point of connection of said one tap to gate at least one output signal of said signal source to said output circuit.

2. In an electronic sampling switch device for selectively controlling the gating of signals from a signal source, a delay line including a set of taps connected to said delay line at successively spaced intervals therealong, signal means for coupling at least a first and a second signal to said delay line to coincide at a predetermined one of said taps to provide a coincident pulse of increased amplitude thereat, and gate means including a first input circuit connected to said tap, a second input circuit connected to said signal source, an output circuit, and means responsive to the occurrence of said coincident pulse of increased amplitude on said line substantially at the point of connection of said one tap to gate at least one output signal of said signal source to said output circuit.

3. In an electronic sampling switch device for selectively controlling the gating of signals from a signal source, a delay line including a set of taps connected to said delay line at successively spaced intervals therealong, signal means for coupling at least a first and a second signal to said delay line to coincide at a predetermined one of said taps to provide a coincident pulse of increased amplitude thereat including means for varying the relative time of application of said signals thereto to selectively vary the one of said taps at which said coincidence occurs, and gate means including a first input circuit connected to an associated one of said taps, a second input circuit connected to said signal source, an output circuit, and means responsive to the occurrence of said coincident pulse of increased amplitude on said line substantially at the point of connection of said one tap to gate the signal output of said signal source to said output circuit.

4. In an electronic sampling switch device for selectively controlling the gating of signals from a signal source, a delay line including a set of taps connected to said line at spaced intervals therealong, signal means for coupling at least a first and a second signal to said delay line to coincide at a predetermined one of said intervals and to provide a coincident pulse of increased amplitude thereat, a plurality of gate means each of which includes a first input circuit connected to an associated one of said taps, the input circuit of different gates being connected to different ones of said taps, a second input circuit connected to said signal source, an output circuit, and means responsive only to the occurrence of said coincident pulse of increased amplitude on said line substantially at the point of connection of its interconnected tap to gate at least one output signal of said signal source to said output circuit.

5. In an electronic sampling switch as set forth in claim 4 which includes a common output circuit, and means for connecting the output circuit of each of said gate means to said common output circuit.

6. In an electronic sampling switch as set forth in claim 4 which includes a plurality of additional signal sources, and which includes means for coupling each of the gate means to a different one of said signal sources.

7. In an electronic sampling switch device for selectively controlling the gating of signals from a signal source, a delay line including a set of taps connected to said line at spaced intervals therealong, signal means for coupling at least a first and a second signal to said delay line to coincide at a predetermined one of said intervals to provide a coincident pulse at the interval of coincidence, and gate means including a first diode member having an anode element connected to one of said taps, a second diode member having an anode element connected to said signal source, a third diode member having an anode element connected to an output circuit, each of said diode members having a cathode element connected to a common point, bias means for normally biassing said first and second diodes to conduct and said third diode member to cut-off, said first diode being biassed to cutoff responsive only to the occurrence of said coincident pulse of increased amplitude on said line substantially at the point of connection of said one tap to thereby bias said third diode to conduct and to couple the signal output of said signal source and said second diode to said output circuit.

8. In an electronic sampling switch device, a delay line including a set of taps connected to said line at spaced intervals therealong, a second signal conducting line, signal means for coupling at least a first signal to said delay line and a second signal to said second line in timed relation with said first signal, a signal source for providing a number at different output signals, an output circuit, and gate means including means coupled to said signal source for gating at least one of said output signals of said signal source to said output circuit only responsive to the occurrence of said first signal on said first line substantially at the point of connection of said one tap and the coupling of said second signal over said second line to said gate means at the approximate time of occurrence of said first signal adjacent said one tap.

9. In an electronic sampling switch device, a delay line including a set of taps connected to said line at spaced intervals therealong, a second signal-conducting line, signal means for coupling at least a first signal to said delay line and a second signal to said second line in timed relation with said first signal, a plurality of signal sources, at least certain ones of which provide different output signals, an output circuit, a plurality of gate means, each of which is connected between a different tap on said delay line and said second signal conducting line and at least one of said signal sources including means operative to couple the output signals of the connected one of said signal sources to said output circuit only responsive to the occurrence of said first signal on said first line substantially at the point at connection of its connected tap and the simultaneous coupling of said second signal over said second line to said gate means, different gate means being connected to couple different ones of said output signals to said output circuit.

10. In an electronic sampling switch device, a delay line including a set of taps connected to said line at spaced intervals therealong, a second signal-conducting line, signalling means for coupling at least a first signal to said delay line and a second signal to said second line in timed relation with said first signal, a signal source for providing a plurality of output signals which differ in predetermined characteristics, and a plurality of gate means, each of which includes a first input circuit connected to one of said taps, a second input circuit connected to said signal source, a third input circuit connected to said second line, an output circuit, and means operative to couple at least one of said output signals of said predetermined characteristics to said output circuit only responsive to the occurrence of said first signal on said first line substantially at the point of connection of said one tap and the simultaneous coupling of said second signal over said second line to said third input circuit, different gate means being connected to gate different ones of said output signals.

(References on following page)

References Cited in the file of this patent

UNITED STATES PATENTS

| | | |
|---|---|---|
| 2,403,561 | Smith | July 9, 1946 |
| 2,444,438 | Grieg | July 6, 1948 |
| 2,516,888 | Levy | Aug. 1, 1950 |
| 2,691,727 | Lair | Oct. 12, 1954 |
| 2,748,269 | Slutz | May 29, 1956 |
| 2,961,609 | Manring | Nov. 22, 1960 |

OTHER REFERENCES

"Pulse and Digital Circuits," Millman and Taub, McGraw-Hill, 1956, page 398.